United States Patent
Petrak et al.

(10) Patent No.: US 11,724,532 B2
(45) Date of Patent: Aug. 15, 2023

(54) PARTICLE-FREE ADHESIVE GOLD INKS

(71) Applicant: Liquid X Printed Metals, Inc., Pittsburgh, PA (US)

(72) Inventors: Christianna M Petrak, Brackenridge, PA (US); Chengeto Gwengo, Beaver Falls, PA (US)

(73) Assignee: LIQUID X PRINTED METALS, INC., Pittsburgh, PA (US)

( * ) Notice: Subject to any disclaimer, the term of this patent is extended or adjusted under 35 U.S.C. 154(b) by 154 days.

(21) Appl. No.: 16/879,410

(22) Filed: May 20, 2020

(65) Prior Publication Data

US 2020/0369061 A1 Nov. 26, 2020

Related U.S. Application Data

(60) Provisional application No. 62/850,139, filed on May 20, 2019.

(51) Int. Cl.
*B41M 5/00* (2006.01)
*C09D 11/52* (2014.01)
(Continued)

(52) U.S. Cl.
CPC .......... *B41M 5/0023* (2013.01); *B41J 2/2107* (2013.01); *C09D 11/328* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 3,661,959 A 5/1972 Vaughan
5,252,764 A 10/1993 Lotze et al.
(Continued)

FOREIGN PATENT DOCUMENTS

DE 102008026071 B4 12/2009
WO 2001040392 A1 6/2001
(Continued)

OTHER PUBLICATIONS

Schoner, C. et al., Particle-free gold metal-organic decomposition ink for inkjet printing of gold structures, Thin Solid Films, vol. 531, Mar. 15, 2013, pp. 147-151 (abstract).
(Continued)

*Primary Examiner* — Manish S Shah
(74) *Attorney, Agent, or Firm* — Dentons Cohen & Grigsby P.C.

(57) ABSTRACT

Described herein are adhesive gold inks, and methods for making and depositing these inks to form conductive traces. The adhesive gold inks generally contain a gold complex dissolved in a mixed solvent system including at least a diol and an amine. The mixed solvent system may further include a thioalkyldiol. The gold complex includes a first ligand and a second ligand. The first ligand may be a thioether, a phosphine, or an amine that volatilizes upon heating at a temperature of 200° C. or less. The second ligand may be a halide or a carboxylate. The adhesive gold inks are clear and particle-free and may be formulated for deposition by a wide range of printing methods on both flexible and non-flexible substrates.

20 Claims, 3 Drawing Sheets

(51) Int. Cl.
*C09D 11/328* (2014.01)
*B41J 2/21* (2006.01)
*C09D 11/38* (2014.01)
*B41J 2/01* (2006.01)

(52) U.S. Cl.
CPC .............. *C09D 11/52* (2013.01); *B41J 2/01* (2013.01); *C09D 11/38* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 3/4078; B41J 11/0021; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227; B41F 23/042; B41F 23/0436

See application file for complete search history.

(56) References Cited

U.S. PATENT DOCUMENTS

| | | |
|---|---|---|
| 5,312,480 A | 5/1994 | DeGussa |
| 7,473,513 B1 | 1/2009 | Jeong et al. |
| 7,651,674 B2 | 1/2010 | Jun et al. |
| 10,189,271 B2 | 1/2019 | Lussier et al. |
| 2003/0118729 A1* | 6/2003 | Bishop ............. C07C 323/52 427/256 |
| 2004/0089197 A1* | 5/2004 | Taguchi ............. C09D 11/30 106/31.01 |
| 2008/0206488 A1* | 8/2008 | Chung ............... C09D 11/30 252/514 |
| 2011/0111138 A1* | 5/2011 | McCullough ..... C09D 11/322 427/125 |
| 2012/0300203 A1 | 11/2012 | Tyagi et al. |
| 2013/0236656 A1* | 9/2013 | McCullough ..... C09D 11/322 427/532 |
| 2014/0170395 A1* | 6/2014 | Kasperchik ...... C09D 11/322 347/100 |
| 2015/0299489 A1* | 10/2015 | Walker ............... C09D 11/34 106/31.92 |
| 2016/0381844 A1* | 12/2016 | Knox ................. H05K 3/4685 29/739 |
| 2017/0096571 A1 | 4/2017 | Fores Fernandes et al. |
| 2019/0249026 A1 | 8/2019 | Gwengo et al. |

FOREIGN PATENT DOCUMENTS

| | | | |
|---|---|---|---|
| WO | 2003032084 A2 | 4/2003 | |
| WO | WO-03032084 A2 * | 4/2003 | ............. B01J 21/18 |

OTHER PUBLICATIONS

Bishop, P., The Use of Gold Mercaptides for Decorative Precious Metal Applications, Gold Bulletin, 2002, vol. 35, No. 3, p. 89-98.

Kim, H. et al., Synthesis and Characterization of Janus Gold Nanoparticles, Adv. Mater. 2012, 24, 3857-3863, WILEY-VCH Verlag GmbH & Co. KGaA, Weinheim.

Chen, S. et al., Synthesis and Characterization of Carboxylate-Modified Gold Nanoparticle Powders Dispersible in Water, Langmuir 1999, 15, 4, 1075-1082 Publication Date: Jan. 28, 1999 (abstract).

* cited by examiner

PARTICLE-FREE ADHESIVE GOLD INKS

CROSS-REFERENCE TO RELATED APPLICATIONS

The present application claims the benefit under 35 U.S.C. § 119(e) of prior U.S. Provisional Application Ser. No. 62/850,139, filed May 20, 2019, the entire content of which is incorporated herein.

TECHNICAL FIELD

This invention pertains generally particle-free gold inks, methods of making the inks, and articles comprising the inks.

BACKGROUND

Printed electronics are increasingly finding uses in a great variety of applications, including portable electronics, signage, lighting, product identification, packaging flexible electronic devices (such as those that can be rolled or bent), photovoltaic devices, medical and diagnostic devices, antennas (including RFID antennas), displays, sensors, thin-film batteries, electrodes and myriad others. Printed electronics have a variety of advantages over electronics made using other methods, including subtractive methods. Printing can be faster than normal subtractive methods (such as etching) and can generate less waste and involve the use of fewer hazardous chemicals than in such methods. The resulting electronics can be more facilely used in flexible devices, such as displays, that are designed to be rolled, twisted, bent, or subjected to other distortions during use.

Printed electronics are typically made by printing the electronic circuit or other component or device on a substrate using an electrically conductive metal-based ink. The inks typically contain silver particles, and occasionally copper particles, other metallic particles, and/or conductive polymers. However, conductive polymers alone are generally not sufficiently electrically conductive. Furthermore, the resulting printed metallic circuits are usually insufficiently electrically conductive to be effective in most applications, including in devices in which the circuits are regularly stressed by bending and/or stretching during use. The printed substrates must therefore often be heated at elevated temperatures to sinter the conductive metal particles in order to achieve the desired levels of electrical conductivity. The temperatures used in sintering processes frequently limit the substrates that can be selected for the preparation of the electronics. For example, while it would be desirable to use inexpensive materials such as paper, polyolefins (e.g., polypropylene), and the like as substrates for printed electronics in many applications, the sintering temperatures often required are too high to be used with paper and most plastics.

Moreover, these nanoparticle-based inks generally suffer from poor long-term storage stability and/or undergo aggregation of particles or precipitation, causing nozzle clogging during printing. For the purpose of preventing such problems, polymeric materials are usually used as stabilizers. However, excessive use of the stabilizers increases the viscosity of the inks or causes other problems, such as increased surface tension, high sintering temperature, and decreased conductivity. Moreover, such conductive inks often have poor adhesion to substrates.

Accordingly, there exists a need in the art for improved conductive inks that may solve the problems of the prior art. Thus, an object of the present invention is to provide a conductive ink that can be easily formed into a thin film, is highly conductive, and has good adhesion to a substrate.

SUMMARY

Described herein are unique gold complexes useful for forming particle-free adhesive gold inks. Also described herein are methods for forming the gold complexes, methods for formulating particle-free adhesive gold inks comprising these gold complexes, methods for depositing the particle-free adhesive gold inks, and substrates having these particle-free adhesive gold inks deposited thereon.

Accordingly, the presently disclosed invention provides an adhesive gold ink comprising: a gold complex, wherein the gold complex includes a first ligand and a second ligand, wherein the first ligand volatilizes upon heating at a temperature of 200° C. or less; and a mixed solvent system, wherein the ink is substantially free of particles.

According to certain aspects, the mixed solvent system is an aqueous solvent system.

According to certain aspects, both the first and second ligand volatilize upon heating at a temperature of 200° C. or less.

According to certain aspects, each of the first and second ligand volatilize upon heating at a temperature of 150° C. or less.

According to certain aspects, the ink is totally free of particles, including nanoparticles and microparticles.

According to certain aspects, the ink is substantially or totally clear in the absence of additional colorants or dyes.

According to certain aspects, the first ligand is a thioether, a phosphine, or an amine.

According to certain aspects, the second ligand is a halide.

According to certain aspects, the second ligand is a carboxylate comprising a linear, branched or cyclic alkyl group. For example, the second ligand may be a carboxylate represented by —O—C(O)—R, wherein R is an alkyl group having 10 carbons or less, such as 5 carbon atoms or less.

According to certain aspects, the ink shows a single sharp decomposition transition beginning at a temperature of 200° C. or less, such as beginning at a temperature of 150° C. or less, or 120° C. or less.

According to certain aspects, the solvent system comprises a mixture of two or more polar protic solvents, such as a mixture of at least one diol and at least one diamine.

According to certain aspects, the solvent system comprises a mixture of two or more polar protic solvents, such as a mixture of at least one alcohol, at least one amine, and a surfactant. For example, the solvent system may comprise at least one alkyl alcohol, at least one diol, at least one amine, at least one thiolalkyldiol, and at least one surfactant, wherein the alkyl alcohol, the diol, and the thiolalkyldiol are different from each other (i.e., not the same solvent).

According to certain aspects, the ink has a viscosity measured at 25° C. of greater than 50 centipoise (cps), such as greater than 100 cps, or 100 cps to 200 cps.

According to certain aspects, the ink has a viscosity measured at 25° C. of 25 cps or less, such as 20 cps or less, or even 10 cps or less.

According to certain aspects, the ink comprises greater than 15 wt. % of the gold complex, such as about 30 wt. % gold complex, based on the total weight of the adhesive gold ink. For example, the ink may comprise up to 25 wt. % gold, such as from 15 wt. % to 25 wt. % gold, or from 20 wt. % to 25 wt. % gold based on the total weight of the adhesive gold ink.

According to certain aspects, the ink comprises 10 to 15 wt. % of the gold complex, based on the total weight of the adhesive gold ink. According to yet further aspects, the ink comprises 10 to 15 wt. % of the gold complex; 15 to 25 wt. % of the at least one alkyl alcohol; 10 to 15 wt. % of the at least one diol; 1 to 3 wt. % of the at least one amine; 1 to 5 wt. % of the at least one thiolalkyldiol; and less than 0.1 wt. % of a surfactant, wherein the wt. % is based on the total weight of the adhesive gold ink.

The invention further provides a method for forming a conductive trace on a substrate, wherein the method comprises depositing any of the adhesive gold inks described herein; and reducing the ink to produce a metallic conductive film.

According to certain aspects, a viscosity of the ink formulation is configured for inkjet deposition or spin coating, such as from 1 to 25 cps, and the depositing step is carried out by inkjet deposition or spin coating.

According to certain aspects, a viscosity of the ink formulation is configured for flexographic printing, such as from 50 to 500 cps, and the depositing step is carried out by flexographic printing.

According to certain aspects, a viscosity of the ink formulation is configured for screen printing, such as at least 500 cps, and the depositing step is carried out by screen printing.

According to certain aspects, the adhesive gold ink is substantially free of particles before deposition and/or substantially free of particles after deposition.

According to certain aspects, the reducing step is carried out by heating, irradiating, or by exposure to a reactive gas. For example, the reducing step may be carried out by heating at a temperature of 250° C. or less, 200° C. or less, or 150° C. or less.

According to certain aspects, the metallic conductive film may be in the form of a line, with a conductivity of at least 1,000 S/m, at least 10,000 S/m, or at least 100,000 S/m.

According to certain aspects, the substrate may be a flexible substrate or a non-flexible substrate. The substrate may be a polymer, glass, ceramic or other synthetic or non-synthetic substrate. The substrate may be a textile, such as a knit, woven, or nonwoven fabric comprising fibers of polyester, polyamides, spandex, nylon, Evolon®, elastane, cotton, cellulose, silk, wood, wool, or blends thereof.

The presently disclosed invention also provides substrates having the inventive particle-free adhesive gold inks disclosed herein deposited thereon. For example, the present invention relates to a substrate comprising a conductive trace or film deposited by any of the conductive particle-free inks disclosed herein. The present invention also related to flexible substrates such as textile substrates produced by the method disclosed herein, wherein the substrate may function as a sensor, an electrode, a circuit, an interconnect, a light, an antenna, a resistive heating element, a switch, a battery, or any combination thereof ("e-textile").

BRIEF DESCRIPTION OF THE DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the presently disclosed invention, unless stated to be otherwise, are not necessarily drawn to scale.

DETAILED DESCRIPTION

In the following description, the present invention is set forth in the context of various alternative embodiments and implementations involving particle-free adhesive gold inks, methods of making and printing the particle-free adhesive gold inks, and articles having the particle-free adhesive gold inks printed thereon. While the following description discloses numerous exemplary embodiments, the scope of the present patent application is not limited to the disclosed embodiments, but also encompasses combinations of the disclosed embodiments, as well as modifications to the disclosed embodiments.

Various aspects of the particle-free gold inks, methods of making and using the inks, and substrates comprising the inks disclosed herein may be illustrated by describing components that are coupled, attached, and/or joined together, or method steps that are linked. As used herein, the terms "coupled", "attached", "linked", and/or "joined" are interchangeably used to indicate either a direct connection between two components or method steps or, where appropriate, an indirect connection to one another through intervening or intermediate components or steps. In contrast, when a component is referred to as being "directly coupled", "directly attached", "directly linked", and/or "directly joined" to another component or method step, there are no intervening elements or steps shown in said examples Various aspects of the inks, methods, and substrates disclosed herein may be described and illustrated with reference to one or more exemplary implementations. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described event or circumstance may or may not occur, and that the description includes instances where the event occurs and instances where it does not. In addition, the word "comprising" as used herein means "including, but not limited to".

Relative terms such as "lower" or "bottom" and "upper" or "top" may be used herein to describe one element's relationship to another element illustrated in the drawings. It will be understood that relative terms are intended to encompass different orientations of aspects of the substrate disclosed herein in addition to the orientation depicted in the drawings. By way of example, if aspects of the substrates in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. For example, although reference is made to "a" ligand, "a" solvent, "a" metal, "an" ink, and "the" metal complex, one or more of any of these components and/or any other components described herein can be used.

Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and appended claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

"Substantially free", as used herein, is understood to mean inclusive of only trace amounts of a constituent. "Trace amounts" are those quantitative levels of a constituent that are barely detectable and provide no benefit to the functional properties of the subject composition, process, or articles formed therefrom. For example, a trace amount may constitute 1.0 wt. %, 0.5 wt. %, 0.1 wt. %, 0.05 wt. %, or even 0.01 wt. % of a component of any of the particle-free ink formulations disclosed herein. "Totally free", as used herein, is understood to mean completely free of a constituent.

Unless defined otherwise, all technical and scientific terms used herein have the same meanings as commonly understood by one of ordinary skill in the art.

The present invention provides methods for generating particle-free adhesive gold inks, methods for printing the ink, and substrates having particle-free adhesive gold inks printed thereon. These inks, when cured or reduced, provide particle-free conductive traces or films. As such, substrates comprising the inks deposited therein may find use in a range of different applications. For example, when deposited on a flexible textile substrate, the conductive traces or films may provide a wide range of flexible electronics ("e-textiles").

Traditional methods of depositing gold include chemical vapor deposition (CVD) and magnetron sputtering. These processes are time consuming and expensive as they are batch processes that are carried out under high vacuum and inert atmospheres.

The inventive processes disclosed herein circumvent many of these difficulties by providing particle-free adhesive ink formulations that may be directly printed on a substrate, and thus provide highly scalable and automated methods for producing printed patterns. The methods generally comprise using a direct printing process, such as inkjet printing, to deposit the particle-free adhesive gold ink on the substrate, which is then cured to produce a conductive pattern thereon. As such, the conductive patterns may be formed on the substrate in a manner that is easily integrated into current manufacturing processes, and more importantly, is easily scalable and can be highly automated.

Gold Complex—First Embodiment

The gold complex according to a first embodiment may be a neutral gold complex comprising a first ligand and a second ligand. The first ligand may be adapted to volatize when heated with formation of a solid product. The first ligand may volatize upon heating at a temperature of, for example, 250° C. or less, or 200° C. or less, or 150° C. or less, or 120° C. or less. The first ligand may be a reductant for the metal. The first ligand may be in a neutral state, such as neither an anion nor a cation.

According to certain aspects of the invention, the first ligand may be a thioether, such as a thioether having the formula $R_1$—S—$R_2$, wherein $R_1$ and $R_2$ may be independently selected from $C_1$-$C_3$ alkyl or may form a saturated heterocyclic compound with the sulfur. Exemplary thioethers include at least dimethyl sulfide, diethyl sulfide, dipropyl sulfide, diisopropyl sulfide, ethyl methyl sulfide, and tetrahydrothiophene. According to certain aspects of the invention, the first ligand may be a phosphine or an amine compound.

In certain preferred examples, the first ligand may comprise a thioether compound with a molecular weight of, for example, about 1,000 g/mol or less, or about 500 g/mol or less, or about 250 g/mol or less.

According to certain aspects of the invention, the second ligand may be a halide, such as fluoride, chloride, bromide, iodide, or astatide.

The gold complexes of the first embodiment can be substantially or totally free of particles, including nanoparticles and microparticles, when formulated as an ink in at least one solvent. The ink can be substantially or totally free of particles, including nanoparticles and microparticles, before deposition or printing. The ink can be substantially or totally free of particles, including nanoparticles and microparticles, after deposition but before reduction to metal (e.g., before curing). A metal trace formed by the ink can be substantially or totally free of particles, including nanoparticles and microparticles, after deposition and reduction to metal. According to certain aspects, the ink may be substantially or totally clear both before and/or after deposition on a substrate but before curing (i.e., reduction to metal).

According to certain aspects of the present invention, the inventive gold complexes according to the first embodiment may be formed by dissolving a phosphine gold halide, amine gold halide, or thioether gold halide in a mixed solvent system comprising at least a diol and a diamine. For example, a gold halide thioether may be dissolved to a concentration of up to 30 wt. % in a diol such as glycol and a diamine such as 1,2-diaminopropane with mild heating to generate an ink formulation having up to about 25 wt. % gold, such as 15 to 25 wt. % gold, or 20 to 25 wt. % gold. Filtration of the solution provides nearly 100% recovery of the gold and provides a clear, particle-free ink solution (i.e., in the absence of any colorants or dyes). Colorants may be added to change a color and/or opacity of the ink and/or of the conductive trace formed after deposition and curing of the ink.

Exemplary inks according to certain aspects of the present invention may comprise up to about 30 wt. % gold halide thioether in a mixed solvent system comprising 1:2 to 2:1 diol:diamine. According to certain aspects, the gold complex may be dissolved in the mixed solvent system at up to 500 mg/mL or less, such as 450 mg/mL or less. The gold inks formed thereby may have viscosities measured at 25° C. of 50 cps or greater, such as 100 cps or greater, or even 150 cps or greater, or between 100 cps and 200 cps.

Gold Complex—Second Embodiment

Complex Formulation

The gold complex according to a second embodiment may be a neutral gold complex comprising a first ligand and a second ligand. The first ligand may be adapted to volatize when heated without formation of a solid product. For example, the first ligand may volatize upon heating at a temperature of, for example, 250° C. or less, or 200° C. or less, or 150° C. or less, or 120° C. or less. The first ligand may be in a neutral state, such as neither an anion nor a cation.

According to certain aspects of the invention, the first ligand may be a thioether, such as a thioether having the formula $R_1$—S—$R_2$, wherein $R_1$ and $R_2$ may be independently selected from $C_1$-$C_3$ alkyl or may form a saturated heterocyclic compound with the sulfur. Exemplary thioethers include at least dimethyl sulfide, diethyl sulfide, dipropyl sulfide, diisopropyl sulfide, ethyl methyl sulfide, and tetrahydrothiophene. According to certain aspects of the invention, the first ligand may be a phosphine or an amine compound.

In particular examples, the first ligand may comprise a thioether compound with a molecular weight of, for example, about 1,000 g/mol or less, or about 500 g/mol or less, or about 250 g/mol or less.

The second ligand is different from the first ligand and may also volatilize upon heating the gold complex. For example, the second ligand may release carbon dioxide, as well as volatile small organic molecules. The second ligand may be adapted to volatilize when heated without formation of a solid product. The second ligand may volatize upon heating at a temperature of, for example, 250° C. or less, or 200° C. or less, or 150° C. or less, or 120° C. or less. The second ligand can be anionic. The second ligand may be self-reducing.

According to certain aspects of the invention, the second ligand may be a carboxylate. The carboxylate may comprise a linear, branched or cyclic alkyl group. In one embodiment, the second ligand does not comprise an aromatic group. The second ligand may be an amide represented by —N(H)—C(O)—R, wherein R is a linear, branched or cyclic alkyl group, with 10 or fewer carbon atoms, or 9 or fewer carbon atoms, or 8 or fewer carbon atoms, or 7 or fewer carbon atoms, or 6 or fewer carbon atoms, or 5 or fewer carbon atoms. The second ligand can also be an N-containing bidentate chelator.

In particular examples, the second ligand may be isobutyrate, oxalate, malonate, fumarate, maleate, formate, glycolate, lactate, citrate, or tartrate. The molecular weight of the second ligand, including the carboxylate, may be, for example, about 1,000 g/mol or less, or about 500 g/mol or less, or about 250 g/mol, or about 150 g/mol or less or less.

The gold complex of the second embodiment can be substantially or totally free of particles, including nanoparticles and microparticles, when in the dried state (powder) or when formulated as an ink in at least one solvent. The ink can be substantially or totally free of particles, including nanoparticles and microparticles, before deposition or printing. The ink can be substantially or totally free of particles, including nanoparticles and microparticles, after deposition but before reduction to metal (e.g., before curing). A conductive film formed by the deposited ink can be substantially or totally free of particles, including nanoparticles and microparticles, after deposition and reduction to metal.

The ink can be substantially or totally clear both before and/or after deposition but before curing (i.e., in the absence of any added colorants or dyes). Colorants may be added to change a color and/or opacity of the ink and/or of the conductive trace formed after deposition and curing of the ink.

According to certain aspects of the present invention, the inventive gold complexes according to the second embodiment may be formed by reaction of a phosphine gold halide or thioether gold halide (referred to as substituted gold halide) with a metal carboxylate. According to certain aspects, the soft thioether ligand stabilizes the soft gold (I) ion according to Pearson's hard and soft acid and bases principle. Thus, a preferred reactant includes a thioether gold halide.

The reaction may include stoichiometric amounts of the two reactants, or an excess of the metal carboxylate, such as about 0.1 to about 1 mole of the substituted gold halide to about 1 mol of the metal carboxylate, or about 0.5 mol of the substituted gold halide to about 1 mol of the metal carboxylate, or about 1 mol of the substituted gold halide to about 10 mol of the metal carboxylate, or about 1 mol of the substituted gold halide to about 2 mol of the metal carboxylate, or about 1 mol of the substituted gold halide to about 1.5 mol of the metal carboxylate.

Exemplary metal carboxylates include at least potassium carboxylates, silver carboxylates, and thallium carboxylates. Carboxylates of the metal carboxylate include a linear, branched or cyclic alkyl group, or may be represented by the formula —O—C(O)—R, wherein R is an alkyl group having 10 carbons or less, such as 9 or fewer carbon atoms, or 8 or fewer carbon atoms, or 7 or fewer carbon atoms, or 6 or fewer carbon atoms, or 5 carbon atoms or less. Exemplary carboxylates include at least acetate, isobutyrate, oxalate, malonate, fumarate, maleate, formate, glycolate, lactate, citrate, or tartrate.

The reaction is an exchange reaction where the substituted gold halide exchanges the halide group with the carboxylate group of the silver carboxylate to form a substituted gold carboxylate and a silver halide (silver salt). When the reaction is carried out in hydrocarbon solvents, the substituted gold carboxylate ("metal complex") remains soluble and the silver halide (silver salt) is sparingly soluble or insoluble.

Mixed Solvent System

The gold complex according to the second embodiment described herein is provided as an aqueous solution in a mixed solvent system. The mixed solvent system can comprise, for example, two or more polar protic solvents. According to certain aspects, the solvent system may comprise at least one alcohol, at least one amine, and a surfactant. According to certain other aspects, the solvent system may comprise at least one alkyl alcohol, at least one diol, at least one amine, at least one thiolalkyldiol, and at least one surfactant, such as a silyl surfactant. The at least one alkyl alcohol, the at least one diol, and the at least one thiolalkyldiol are not the same.

Exemplary alkyl alcohols of the mixed solvent system may comprise 1-6 carbons atoms, such as at least methanol, ethanol, 1-propanol, 2-propanol, n-butanol, 2-butanol, 2-methyl-1-propanol, 2-methyl-2-propanol, 2-methyl-1-butanol, and 2-methyl-2-butanol.

Exemplary diols of the mixed solvent system include at least ethylene glycol, 1,2-hexanediol, diethylene glycol, triethylene glycol, 1,3-propanediol, 1,3-butanediol, 1,2-butanediol, 2,3-butanediol, propylene glycol, dipropylene glycol, tripropylene glycol, trimethylene glycol, and 1,4-butanediol.

Exemplary amines of the mixed solvent system include at least ammonium hydroxide, tetramethylammonium hydroxide, tetraethylammonium hydroxide, ethylenediamine, propylene diamine, 1,2-diaminopropane, and diethyl ethylenediamine.

Exemplary thiolalkyldiols of the mixed solvent system include at least thiodiglycol, 1,4-dithiane-2,5-diol, and 3,6-diathiaoctane-1,8-diol.

According to certain aspects, the solvent system may by an aqueous solvent system comprising 15 to 25 wt. % of the at least one alkyl alcohol; 10 to 15 wt. % of the at least one diol; 1 to less than 3 wt. % of the at least one amine, 1 to 5 wt. % of the at least one thiolalkyldiol, and less than 0.1 wt. % of the surfactant (such as 0.001 to 0.1 wt. %), based on the total weight of the ink composition. According to certain aspects, the gold complex may be included in this solvent system at 5 to 50 wt. %, such as 5 to 25 wt. %, or 5 to 15 wt. % based on the total weight of the ink composition.

According to certain aspects, the gold complex may be dissolved in the mixed solvent system at up to 2,500 mg/mL or less, such as 1,000 mg/mL or less, or 500 mg/mL or less, or at 200 mg/mL, or at 150 mg/mL, or at 100 mg/mL. The gold inks formed thereby may have viscosities measured at 25° C. of 200 cps or less, or 50 cps or less, or even 25 cps or less.

Characteristics of the Metal Complexes and Compositions

The gold complex of the second embodiment can have a sharp decomposition transition beginning at a temperature of less than 250° C., or less than 200° C., or less than 150° C., or less than 120° C.

The gold complex composition can be stored at about 25° C. for at least 100 hours, or at least 24 hours, or at least 48 hours, or at least 72 hours. The composition can be stored at lower temperatures such as, for example, less than 25° C. to provide longer stability. For example, some composition can be stored at 0° C. for very long periods of time including, for example, at least 30 days, or at least 90 days, or at least 365 days. Alternatively, for example, some composition can be stored at −35° C. or lower for very long periods of time including, for example, at least 30 days, or at least 90 days, or at least 365 days.

The gold complexes can comprise, for example, at least 5 wt. % metal, or at least 15 wt. % metal, or at least 20 wt. % metal, or at least 30 wt. % metal, or at least 40 wt. % metal. This provides for efficient use of metal and good conductivity upon conversion to metal.

The gold complexes can be adapted to provide sufficient stability to be commercially useful, but also sufficiently reactive to provide low cost, high quality products. One skilled in the art can adapt the first and second ligands to achieve a balance needed for a particular application.

Direct Printing

The gold inks of the presently disclosed invention are highly adhesive to substrates. Methods known in the art can be used to deposit the inventive inks disclosed herein, including, for example, pipetting, inkjet printing, lithography or offset printing, gravure or gravure offset printing flexographic printing, microdispersion direct write printing, screen printing or rotary screen process printing, offset printing, stencil printing, drop casting, slot die, roll-to-roll, stamping, roll coating, spray coating, flow coating, extrusion printing, and aerosol delivery such as spraying or pneumatic or ultrasonic aerosol jet printing. One can adapt the ink formulation and the substrate with the deposition method.

In certain examples, the particle-free adhesive gold inks are deposited by direct printing methods such as pipetting, stencil printing, rolling, spraying, or inkjet printing. In certain examples, the particle-free gold inks are deposited using inkjet printing.

When printed on a textile, the gold inks may provide conformal coating of the textile fibers that allows for greatly improved conductivity and longevity of the conductive trace formed thereby. As used herein, the term "conformal" shall be taken to mean a coating that covers at least the surface of a textile, fiber, or substrate, and which follows the contours of the surface.

According to certain aspects, the gold inks of the present invention are printed directly onto a surface of the substrate.

According to certain aspects, the substrate may benefit from pre-treatment, such as prewashing and/or treating by oxygen plasma, corona, and/or chemical etch (e.g., acidic, caustic). Accordingly, the conductive inks of the present invention may be printed on the substrate after it has been pretreated by oxygen plasma, corona, and/or chemical etch. Additionally, certain substrates may benefit from addition of a coating. For example, cellulose based substrates such as paper and/or cotton textiles may need a coating to reduce ink bleed and enhance conductivity of traces formed thereon. That is, the cellulose or cotton based substrates may be coated with a transparent layer, such as a polyurethane coating prior to printing the conductive pattern.

One can adapt the viscosity of the gold ink to the deposition method. For example, viscosity can be adapted for inkjet printing. Viscosity of the ink formulations measured at 25° C. can be, for example, about 500 cps or less, such as 200 cps or less, or 50 cps or less, or even 25 cps or less. Viscosity of the ink formulations measured at 25° C. can be, for example, at least 50 cps. Viscosity of the ink formulations measured at 25° C. can be, for example, about 50 cps or less, such as about 25 cps or less. According to certain other aspects, the viscosity of the ink formulations measured at 25° C. can be, for example, about 1 cps to about 20 cps, or about 1 cps to about 10 cps. Viscosity of the ink formulations may be tuned through selective ratios of polar protic solvents (e.g., ratio of water to amine).

Alternatively, the ink viscosity can be formulated, for example, to be greater than 15 cps, or 20 cps, or even 25 cps, such as by addition of binders, resins, or other additives or solids that may thicken or increase the viscosity of the ink formulation. For example, one can adapt the concentration of dissolved solids in the ink to about 2,000 mg/ml, or 1,500 mg/ml or less, about 1,000 mg/ml or less, about 500 mg/mL or less, about 250 mg/mL or less, about 100 mg/mL or less, about 50 mg/mL or less, or about 10 mg/mL or less.

Thickeners can be added to the ink to increase the viscosity to greater than 25 cps, such as from 25 cps to 150 cps, or from 25 cps to 250 cps, or from 25 cps to 500 cps, such as would be amendable for flexographic printing. Thickeners can be added to the ink to increase the viscosity to greater than 500 cps, such as from 500 cps to 750 cps, or from 500 cps to 1000 cps, or from 500 cps to 2500 cps, such as would be amendable for screen printing.

Exemplary thickeners are known in the art and include at least high molecular weight polyacrylic acids and associative thickeners.

Other additives may be included to adapt the wetting properties of the ink. Additives such as, for example, surfactants, dispersants, colorant (e.g., dye), and/or binders can be used to control one or more ink properties as desired. For example, a hydrophilic binder may aid in wetting certain textiles, and thus may aid in providing a conductive trace that conformally coats the textile fibers (i.e., improve conductivity of the conductive trace).

The conductive ink formulations disclosed herein may include up to 20 wt. % of one or more of any of the additives indicated herein (thickeners, surfactants, colorants, etc.) additives, such as up to 15 wt. %, up to 12 wt. %, up to 10 wt. %, up to 8 wt. %, or up to 6 wt. %, or up to 4 wt. %, or up to 2 wt. %, or up to 1 wt. %, or up to 0.1 wt. %, or up to 0.05 wt. %. The compositions may include additives at from 0.01 wt. % to 20 wt. %, such as 0.01 wt. % to 15 wt. %, or from 0.01 wt. % to 12 wt. %, or from 0.01 wt. % to 10 wt. %, or from 0.01 wt. % to 8 wt. %, or from 0.01 wt. % to 6 wt. %, or from 0.01 wt. % to 4 wt. %, or from 0.01 wt. % to 3 wt. %, or from 0.01 wt. % to 2 wt. %, or from 0.01 wt. % to 1 wt. %.

According to certain aspects, the ink formulations of the present invention are substantially or totally free of additives such as thickeners, surfactants, dispersants, colorant (e.g., dye), and/or binders.

According to certain aspects, the ink formulations of the present invention include a surfactant but are free of additives such as thickeners, dispersants and/or binders.

According to certain aspects, the ink formulations of the present invention include a surfactant and/or a thickener but are free of other additives such as dispersants and/or binders.

Nozzles can be used to deposit the precursor, and the nozzle diameter can be, for example, less than 200 micrometers, or even less than 100 micrometers. The absence of particulates can help with prevention of nozzle clogging. The nozzle may deposit the ink in droplets, wherein a drop size may be less than 200 micrometers, such as less than 100 micrometers, or less than 50 micrometers, or even less than 30 micrometers. The nozzle may deposit the ink in droplets, wherein a drop volume is less than 100 picoliter (pL), or less than 50 pL, or less than 25 pL, or less than 15 pL, or even less than 5 pL. The drops may be deposited at a density greater than 30 drops per inch, such as greater than 60 drops per inch, or greater than 90 drops per inch, or greater than 200 drops per inch, or greater than 500 drops per inch, or greater than 1,000 drops per inch, or greater than 1,500 drops per inch, or greater than 2,500 drops per inch, or greater than 4,000 drops per inch, or greater than 6,000 drops per inch.

According to certain aspects of the present invention, the gold inks of the present invention may be printed on the substrates at ambient conditions, such as at standard room temperatures and pressures.

According to certain aspects of the present invention, the substrate may be heated before and/or during deposition of the ink. For example, the textile substrate may be heated to temperatures of 40° C. to 90° C. (such as on a heated platen).

While specific numbers are listed herein for the size and density of the droplets, volume of the droplets, and the nozzle size, these values may vary depending on the printing method chosen, the printer chosen (e.g., nozzle configuration), the viscosity of the conductive ink, and the coverage desired.

Thus, according to certain methods of the present invention, the conductive inks of the present invention may be deposited on a substrate that is heated during deposition, followed by a curing step that converts the metal complex in the ink formulation to a metallic structure ("in situ curing"). Thus, as used herein, in situ curing may be taken to mean heating the substrate during deposition of the conductive ink followed by any of the curing steps detailed herein that convert the metal complex in the ink formulation to a metallic structure.

According to certain other methods of the present invention, the conductive inks of the present invention may be deposited on a substrate at ambient temperatures (and pressures), followed by a curing step that converts the metal complex in the ink formulation to a metallic structure ("ex situ curing"). Thus, as used herein, ex situ curing may be taken to mean that the textile is not heated during deposition of the conductive ink, and before any of the curing steps detailed herein that convert the metal complex in the ink formulation to a metallic structure.

According to certain aspects, the conductive traces of the presently disclosed invention may have sheet resistance values of less than 10.0 $\Omega/\square$, or less than 8.0 $\Omega/\square$, or less than 6.0 $\Omega/\square$, or less than 4.0 $\Omega/\square$, or less than 2.0 $\Omega/\square$, or less than 1.0 $\Omega/\square$. Certain applications of the conductive traces may benefit from increased sheet resistance, such as more than 2.0 $\Omega/\square$ or 10.0 $\Omega/\square$.

Exemplary systems that may be used in methods of the presently disclosed invention include FujiFilm Dimatix DMP 2850 and DMP 2931. Using this printer, the particle-free conductive inks of the present invention may be printed to substrates pre-heated on the platen using a drop size of 5-200 micrometers, or a drop volume of less than 100 pL, at 60-6,000 drops per inch. The textile may then be cured on the platen in the device, such as for 10 minutes at 140° C. or 10 minutes exposure to infrared radiation or removed to an oven or other area for curing, wherein the metal in the metal complex turns to a solid conductive metal. Curing may be by any method disclosed herein.

Curing the Particle-Free Gold Inks

Once the particle-free gold ink formulations have been printed onto a substrate, they may be cured to form the conductive pattern (i.e., converted to a metallic structure). Curing can include heating the printed substrate, and/or irradiating the printed substrate. In certain examples, the printed substrate may be cured by heating to a temperature of 300° C. or less, such as 250° C. or less, or 200° C. or less, or 150° C. or less, or 120° C. or less, for a time period of less than 60 minutes, such as less than 30 minutes, or less than 15 minutes.

For the adhesive gold inks of the first disclosed embodiment, the printed substrate may be heated to a temperature between 200° C. and 300° C. for 10 minutes or less to form a conductive pattern with a resistance of less than 4 $\Omega/\square$.

For the adhesive gold inks of the second disclosed embodiment, the printed substrate may be heated to 120° C. for 10 minutes, or exposed to infrared radiation for 10 minutes, to form a conductive pattern with a resistance of less than 4 $\Omega/\square$.

In certain examples, the conductive trace on the substrate may be additionally, or alternatively, cured by exposure to pulsed light, such as by photonic curing, wherein the number of pulses ranges from 2 to 20. Alternatively, or in addition, curing may include irradiating the conductive trace on the substrate, such as by exposure to infrared radiation.

Protective Coatings

According to certain aspects of the present invention, the conductive traces formed using the particle-free gold inks disclosed herein may be coated with a protective coating, such as a dielectric coating or an abrasion resistant coating. For example, all or a portion of a trace may be coated with a polymer coating, such as an aqueous dielectric or abrasion resistant polymer solution. Exemplary polymer solutions include at least acrylic and polyurethane polymers. The protective coating can be deposited by painting, spraying, or printing (e.g., inkjet printing). The viscosity of the polymeric solutions can be adjusted for the specific textile and deposition method by dilution with appropriate solvents and solvent mixtures. Such coatings may be cured by heat treatment, evaporation of solvents, irradiation (e.g., UV treatment), or any combination thereof. An exemplary coating includes an acrylic-based coating that is printed over the conductive trace and is cured by heating the textile to 160° C. or less, such as 150° C. or less for 30 minutes or less, such as 20 minutes or less.

Specific exemplary coatings include the dielectric coatings described in U.S. patent application Ser. No. 16/807,286. For example, the dielectric coating compositions may comprise an aqueous binder, an inorganic nanoparticle, and one or more polar protic solvents. The aqueous binder may comprise a polyvinyl alcohol, a hydroxy cellulose, a hydrogel, or a combination thereof. The inorganic nanoparticle may comprise $SiO_2$ nanoparticles, $Al_2O_3$ nanoparticles, $TiO_2$ nanoparticles, $ZrO_2$ nanoparticles, iron oxide nanoparticles, ferrite nanoparticles, nanoclay, or a combination thereof. According to certain aspects, the inorganic nanoparticle may be a colloidal particle. According to certain aspects, the inorganic nanoparticle may have a particle size of less than 100 nm, or even less than 50 nm.

The dielectric coating compositions may have a viscosity measured at 25° C. of 1 to 20,000 centipoise. According to certain aspects, the dielectric coating compositions may have a viscosity suitable for ink jet printing, such as from 2 to 40 cps measured at 25° C. According to certain aspects, the dielectric coating compositions may have a viscosity suitable for gravure printing, such as from 50 to 300 cps measured at 25° C. According to certain aspects, the dielectric coating compositions may have a viscosity suitable for flexographic printing, such as from 100 to 500 cps measured at 25° C.

The dielectric coating compositions may be formulated for printing on a substrate, wherein the composition comprises 2-15 wt. % of an aqueous binder, 1-5 wt. % of a colloidal silica having a particle size of less than 100 nm, and an aqueous solvent, wherein the composition has a viscosity measured at 25° C. of 2 to 400 cps. According to certain aspects, the aqueous binder comprises a polyvinyl alcohol, a hydroxy cellulose, a hydrogel, or a combination thereof. According to certain aspects, the composition may be printed by inkjet, gravure, flexographic, or screen-printing techniques, wherein the viscosity of the ink is adjusted for the specific technique, e.g., for inkjet printing the viscosity measured at 25° C. may be 2 to 40 cps and for flexographic printing the viscosity may be 100 to 400 centipoise.

The protective coatings may provide abrasion resistance and/or may be used to provide an insulating layer over or between conductive traces formed by the adhesive gold inks of the presently disclosed invention.

E-Textile

The present invention is also directed to e-textiles. These e-textiles include any textile having printed thereon at least one conductive trace or pattern using inks and/or methods disclosed herein. The traces may terminate in contact pads or connectors for connection to a current, such as a power supply or battery. Various hardware elements may be connected to portions of the trace or pattern to form electric devices. As such, the conductive patterns on the e-textiles may be formed as a trace or pattern that may provide a sensor (e.g., optical, thermal, humidity, gas, pressure, acceleration, strain, force, and proximity), a conductor, an electrode, a circuit, an interconnect, a light, an antenna, a resistive heating element, a switch, a transparent conductive element, a battery, or any combination thereof.

The e-textiles may be incorporated into or may be wearable electronic devices. The e-textiles may find use in many different industries for a wide range of uses, such as in the medical industry for health monitoring and in industrial settings as smart clothing or devices for gas sensing or filtration. The e-textiles may find use in smart garments, such as for fitness monitoring, hygiene improvement, or as flexible energy storage devices (e.g., batteries, supercapacitors).

Exemplary e-textiles may include, for example, a directional compass, one or more gyroscopes, one or more accelerometers, pressure gauges, strain gauges, temperature gauges, and fiber optics. The sensors employed in e-textiles may be used to monitor parameters of a user wearing the e-textile, such parameters may include heart rate, respiration rate, skin temperature, and body position and movement. Moreover, e-textiles may be used to measure a user's full-body biomechanics such as joint angles, angular velocity, angular acceleration, and range of motion.

EXAMPLES

Gold Complexes According to the First Embodiment

The gold thioether halide complex was dissolved in a mixed solvent system at about 410 mg/ml to provide an ink having 20-25 wt. % gold, a viscosity of 100-200 cps at 25° C., a surface tension of 40-50 dyne/cm, and a density of 1.2-1.3 g/cm$^3$. A substrate coated with this ink by spin coating or drawdown methods was cured by heat treatment at 155° C. for 10 minutes, followed by 250° C. for 5 minutes, to provide a film having 400-500 nm thickness, a sheet resistance of 0.05-0.5 Ω/□, and a conductivity of $4.4\times10^6$ to $1.8\times10^7$. for NaOH treated glass, a coating angle of less than 10 degrees may be optimal, and for corona treated Kapton, a coating angle of less than 5 degrees may be optimal.

Production of a Gold Complexes According to the Second Embodiment

A first component comprising a silver carboxylate was dissolved in a hydrocarbon solvent. The silver carboxylate compound may be prepared by methods disclosed in US Patent Publication 2011/0111138. For example, the metal or silver carboxylate may be prepared by known methods based on metal oxides (e.g., $Ag_2O$), or by a method based on metal acetate, i.e., reaction between a carboxylic acid and metal acetate to provide the metal carboxylate. The latter reaction proceeds to completion and affords analytically pure compounds in quantitative yields. For example, elemental analysis of the reaction between silver acetate and isobutyrate or cyclopropate demonstrated C, 24.59; H, 3.72 and C, 24.68; H, 2.56 for the isobutyrate and cyclopropate, respectively. Theoretical values are C, 24.64; H, 3.62 and C, 24.90; H, 2.61 for the isobutyrate and cyclopropate, respectively.

A second component comprising a thioether-gold-halide was suspended in a hydrocarbon solvent. According to certain aspects, the second component may be a gold complex formed by the first embodiment of the presently disclosed invention. According to certain aspects, a preferred second component may be a thioether-gold-chloride, as the chloride is preferred among the halides for gold ink stability and for clean substitution with the carboxylate.

The first and second components were mixed at ratios of between 10:1 to 1:1, respectively, and allowed to react for several hours. This solution was then filtered to remove excess silver carboxylate and the resulting AgCl, which are sparingly soluble or insoluble in the hydrocarbon solvent. Excess hydrocarbon solvent was removed by rotary evaporation to concentrate the reaction liquid and form a gold complex powder.

The gold complex powder is washed with an ether solvent, filtered, and rewashed with the ether solvent to provide a 70-100% yield of the thioether-gold-carboxylate.

Figure 1:
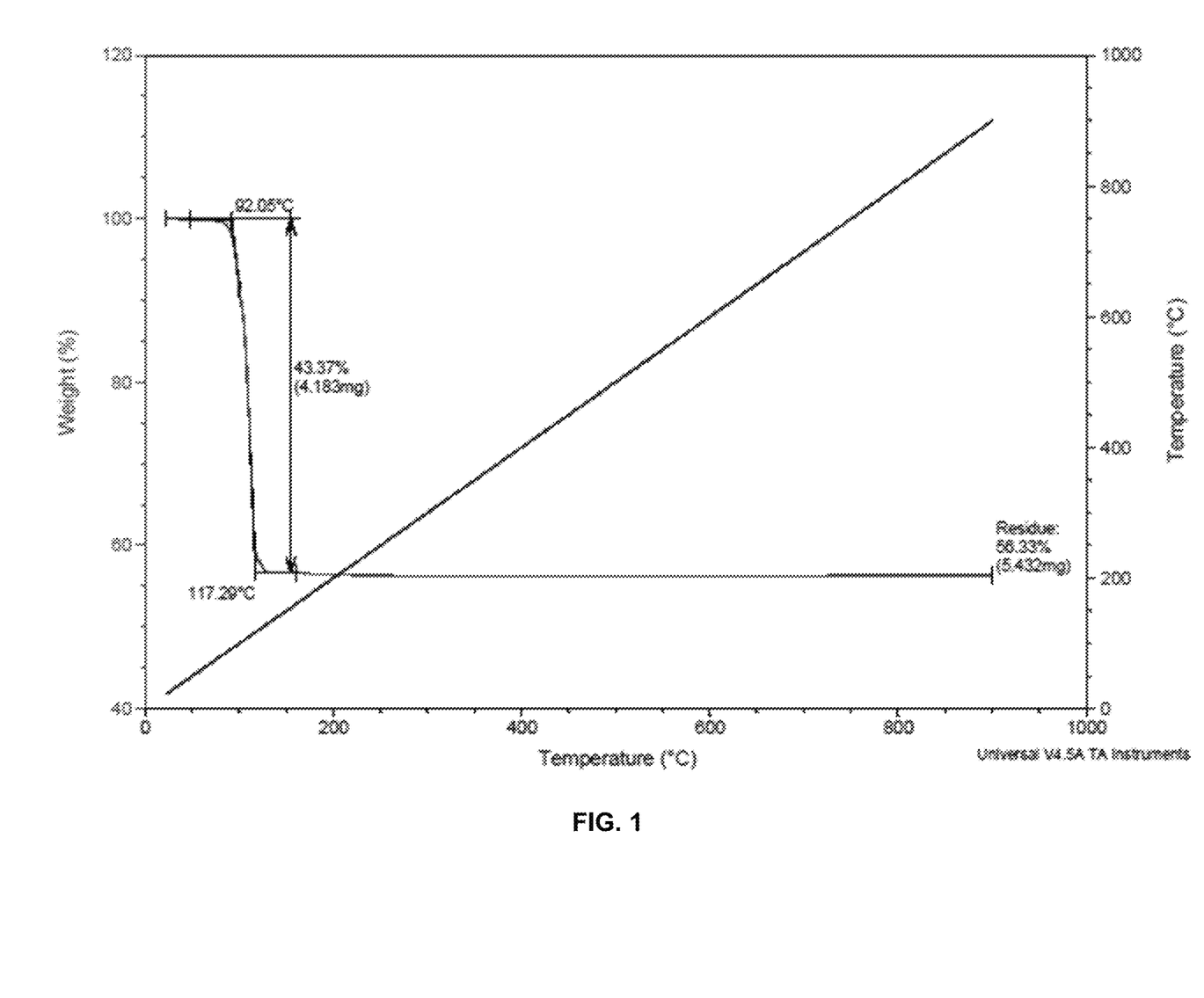
FIG. 1 shows a thermogravimetric analysis of a gold complex according to certain aspects of the presently disclosed invention.
Figure 2:
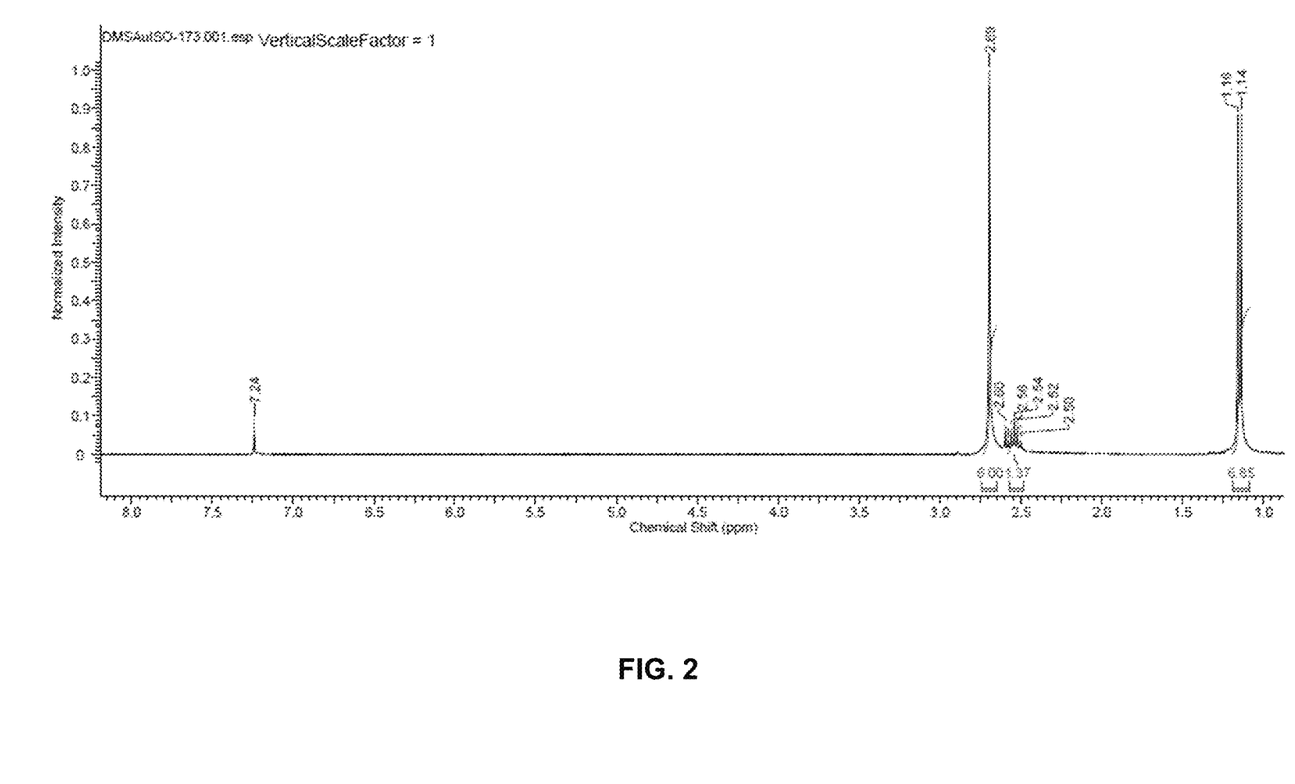
FIG. 2 shows an NMR analysis of a gold complex according to certain aspects of the presently disclosed invention.

Thermogravimetric analysis of the thioether-gold-carboxylate complex was performed as shown in FIG. 1. A single thermal transition was observed between 92° C. and 118° C. showing a residue having 56.33% gold. Shown in FIG. 2 is an $^1$H-NMR analysis of an exemplary particle-free adhesive gold ink produced by this method. Structural analysis using proton NMR showed that the thioether-gold-carboxylate powder dissolved in $D_2O$ consists of stoichiometric amounts of the thioether ligand, gold, and the carboxylate ligand.

Production of Particle-Free Adhesive Gold Ink

The gold complex (i.e., thioether-gold-carboxylate) was dissolved in a mixed solvent system to provide an adhesive gold ink that is substantially or totally free of particles, including microparticles and nanoparticles, and one that is substantially or totally clear. Various solvent concentrations were tested to discern solubility and stability of the gold complex in the mixed solvent system. For example, gold inks comprising 187 g of the gold complex (i.e., thioether-gold-carboxylate) dissolved in 1 ml of a mixed solvent system comprising <1%, 2-15%, or 16-30% ammonia were tested, wherein the mixed solvent included a mixture of water, alcohol, and a diol. While the gold complex showed some precipitation in all of the solvents as observed by a darkened color of the dissolved ink, after filtering, only the lowest % ammonia tested maintained the darkened color, while both the 2-15% and 16-30% ammonia samples filtered to a clear ink.

All three solutions were stored at room temperature for three (3) days to observed stability of the gold ink. The gold complexes dissolved into the mixed solvent system comprising either 2-15% and 16-30% ammonia remained clear, i.e., stable, for at least 3 days, while the gold complexes dissolved into the mixed solvent system comprising only <1% ammonia continued to precipitate, as observed by the darkening color over time.

A maximum concentration of the gold complex in the mixed solvent system of the present invention was determined to be at least 1,000 mg/mL, such as at least about 1,190 mg/mL. Various concentrations of the gold complex in the mixed solvent system of the present invention were tested to determine stability as a function of gold complex concentration and time. For example, the gold complex was formulated at 100, 150, and 200 mg/ml in the mixed solvent system and was found to remain clear and particle-free at room temperature. As shown Table 1, the ink formulations demonstrate a near linear response in surface tension and viscosity as a function of concentration of the gold complex in the mixed solvent system.

TABLE 1

| Gold Complex Concentration (mg/mL) | Surface Tension (dyne/cm) | Surface Tension Temperature | Density (g/mL) at 20° C. | Viscosity (cP) at 25° C. |
| --- | --- | --- | --- | --- |
| 100 | 26.16 ± 0.268 | 25.2 | 0.99462 | 3.62 |
| 150 | 25.39 ± 0.189 | 25.3 | 1.02070 | 4.11 |
| 200 | 25.45 ± 0.138 | 25.5 | 1.04853 | 5.06 |

Deposition and Curing of the Gold Ink

Gold inks were formulated as described above; 100 mg/mL, 150 mg/mL, and 200 mg/mL of the gold complex (e.g., thioether-gold-carboxylate; 5-10 wt. % gold final) was dissolved in the mixed solvent system comprising 2-15% ammonia, and 0.54% of a surfactant (e.g., 5% silicone-containing surface additive). These gold ink formulations were deposited on glass by spin coating and were cured at (a) 120° C. for 5 minutes, (b) 120° C. for 30 minutes, and (c) 120° C. for 30 minutes+150° C. for 10 minutes. All of the films appear to be very thin (50-200 nm; writing on the bottom side of the glass substrate is visible through the cured films), and sheet resistance for these films appears to be optimal at concentrations of 150 and 200 mg/mL (see Table 2 below).

TABLE 2

| | Sheet Resistance (Ω/□) | | | | |
| --- | --- | --- | --- | --- | --- |
| Concentration (mg/mL) | 120° C. for 5 minutes | 120° C. for 10 minutes | 120° C. for 20 minutes | 120° C. for 30 minutes | 120° C. for 30 minutes + 150° C. for 10 minutes |
| 100 | 500 | 300 | 258.3 | 153.5 | 37.3 |
| 150 | 4.6375 | 4.1585 | 4.4930 | 3.9772 | 3.7204 |
| 200 | 3.4252 | 3.5746 | 3.5454 | 3.6099 | 2.8527 |

The same gold inks were also used for inkjet printing on polyethylene terephthalate films cured at 120° C. for 30 minutes, or 120° C. for 30 minutes+150° C. for 10 minutes. The cured films were continuous, even, and had a transparent gold appearance.

Figure 3:
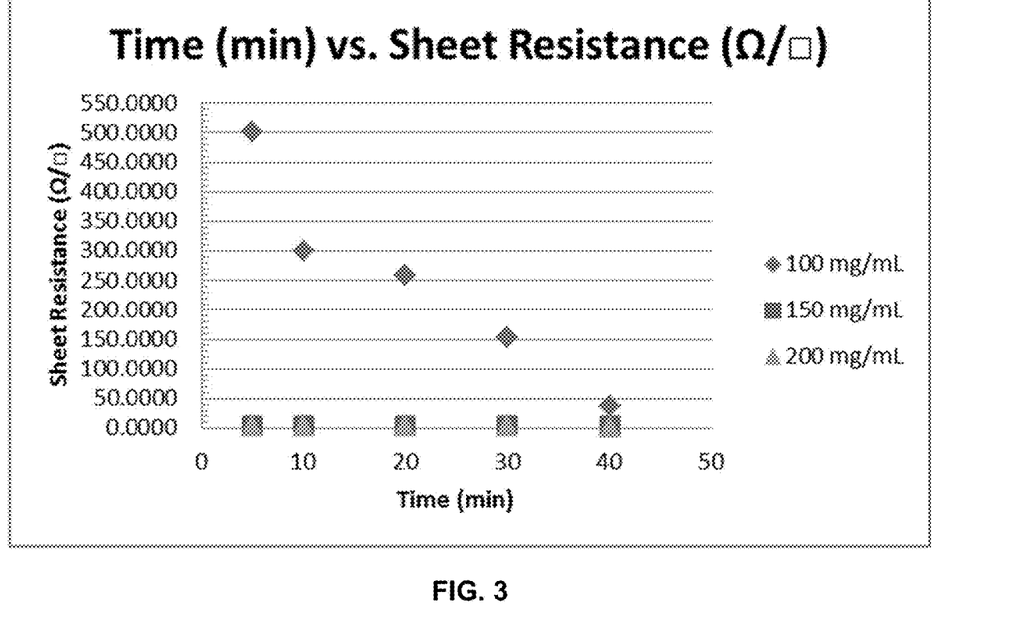
FIG. 3 shows a plot of sheet resistance for various ink formulations as a function of cure time.

The sheet resistance after various cure times and at various ink concentrations is shown in Table 2 (as spin coated onto glass substrates). These data are also plotted and provided in FIG. 3. In general, the gold inks provided films having 50-200 nm thickness, sheet resistance of 2-7 Ω/□, and conductivity of $6 \times 10^5$ to $8 \times 10^5$.

ASPECTS OF THE INVENTION

The following aspects of the present invention are disclosed I this application:

Aspect 1. An adhesive gold ink comprising: a gold complex, the gold complex including a first ligand and a second ligand, wherein the first ligand is a thioether, a phosphine, or an amine that volatilizes upon heating at a temperature of 200° C. or less; and an mixed solvent system comprising at least a diol and an amine, wherein the ink is clear and substantially free of particles.

Aspect 2. The adhesive gold ink according to any preceding aspect, wherein the ink is totally free of particles, including nanoparticles and microparticles.

Aspect 3. The adhesive gold ink according to any preceding aspect, wherein the first ligand is a thioether.

Aspect 4. The adhesive gold ink according to any preceding aspect, comprising 20 to 25 wt. % gold based on the total weight of the adhesive gold ink.

Aspect 5. The adhesive gold ink according to any preceding aspect, wherein the second ligand is a halide.

Aspect 6. The adhesive gold ink according to any preceding aspect, wherein the second ligand is a carboxylate represented by —O—C(O)—R, wherein R is an alkyl group having 10 carbon atoms or less, or 5 carbons or less.

Aspect 7. The adhesive gold ink according to any preceding aspect, wherein the ink shows a single sharp decomposition transition beginning at a temperature of 200° C. or less, such as 150° C. or less.

Aspect 8. The adhesive gold ink according to any preceding aspect, wherein the mixed solvent system comprises at least one alkyl alcohol, at least one diol, at least one amine, at least one thiolalkyldiol, and at least one surfactant.

Aspect 9. The adhesive gold ink according to any preceding aspect, wherein the ink has a viscosity measured at 25° C. of 25 cps or less.

Aspect 10. The adhesive gold ink according to any preceding aspect, comprising 10 to 15 wt. % of the gold complex, based on the total weight of the adhesive gold ink.

Aspect 11. The adhesive gold ink according to any preceding aspect, comprising: 10 to 15 wt. % of the gold complex; 5 to 25 wt. % of the at least one alkyl alcohol; 10 to 15 wt. % of the at least one diol; 1 to 3 wt. % of the at least one amine; 1 to 5 wt. % of the at least one thiolalkyldiol; and less than 0.1 wt. % of a surfactant, wherein the wt. % is based on the total weight of the adhesive gold ink, and wherein the alkyl alcohol, the diol, and the thiolalkyldiol are not the same.

Aspect 12. A method for forming a conductive trace on a substrate, the method comprising: depositing the adhesive gold ink according to any of aspects 1 to 11 on a substrate; and reducing the ink to produce a metallic conductive film, wherein the reducing is carried out by heating, irradiating, or by exposure to a reactive gas.

Aspect 13. The method according to any preceding method aspect, wherein the metallic conductive film has a sheet resistance of less than 10 Ω/□, such as less than 8 Ω/□, or less than 6 Ω/□, or less than 5 Ω/□, or less than 4 Ω/□.

Aspect 14. The method according to any preceding method aspect, wherein the depositing step is carried out by inkjet deposition.

Aspect 15. The method according to any preceding method aspect, wherein the depositing step is carried out by flexographic printing.

Aspect 16. The method according to any preceding method aspect, wherein the reducing is carried out by heating at a temperature of 250° C. or less, 200° C. or less, or 150° C. or less.

Aspect 17. The method according to any preceding method aspect, wherein the metallic conductive film is in the form of a line with a conductivity of at least 1,000 S/m.

Aspect 18. The method according to any preceding method aspect, wherein the substrate is glass, ceramic, plastic, or polymer.

Aspect 19. The method according to any preceding method aspect, wherein the substrate is a flexible textile substrate comprising a knit, woven, or nonwoven fabric comprising fibers of polyester, polyamides, spandex, nylon, Evolon®, elastane, cotton, cellulose, silk, wood, wool, or blends thereof.

Aspect 20. The method according to any preceding method aspect, wherein the adhesive gold ink conformally coats the fibers of the flexible textile substrate.

Aspect 21. The method according to any preceding method aspect, wherein depositing the adhesive gold ink is by inkjet printing on the flexible textile substrate that is heated to a temperature of about 30° C. to about 90° C.

Aspect 22. The method according to any preceding method aspect, further comprising, after curing the adhesive gold ink coating at least a portion of the conductive pattern with a protective dielectric coating.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

What is claimed is:

1. An adhesive gold ink comprising:
   a gold complex, the gold complex including a first ligand and a second ligand, wherein the first ligand is a thioether that volatilizes upon heating at a temperature of 200° C. or less and the second ligand is a halide; and
   a mixed solvent system comprising at least a diol and an amine,
   wherein the ink is clear and substantially free of particles.

2. The adhesive gold ink of claim 1, wherein the ink is totally free of particles, including nanoparticles and microparticles.

3. The adhesive gold ink of claim 1, wherein the mixed solvent system further comprises a thiolalkyldiol.

4. The adhesive gold ink of claim 1, comprising 5 to 50 wt. % gold based on the total weight of the adhesive gold ink.

5. The adhesive gold ink of claim 1, wherein the ink shows a single sharp decomposition transition beginning at a temperature of 200° C. or less.

6. The adhesive gold ink of claim 1, wherein the ink shows a single sharp decomposition transition beginning at a temperature of 150° C. or less.

7. The adhesive gold ink of claim 1, wherein the mixed solvent system is an aqueous solvent system comprising at least one alkyl alcohol, at least one diol, at least one amine, at least one thiolalkyldiol, and at least one surfactant, wherein the at least one alkyl alcohol, the at least one diol, and the at least one thiolalkyldiol are not the same.

8. The adhesive gold ink of claim 1, wherein the ink has a viscosity measured at 25° C. of 500 cps or less.

9. The adhesive gold ink of claim 1, comprising 10 to 15 wt. % of the gold complex, based on the total weight of the adhesive gold ink.

10. A method for forming a conductive trace on a substrate, the method comprising:
    depositing the adhesive gold ink according to claim 1 on a substrate; and
    reducing the ink to produce a metallic conductive film, wherein the reducing is carried out by heating, irradiating, or by exposure to a reactive gas, and the metallic conductive film has a sheet resistance of less than 5 Ω/□.

11. The method of claim 10, wherein the depositing step is carried out by inkjet deposition.

12. The method of claim 10, wherein the reducing is carried out by heating at a temperature of 200° C. or less.

13. The method of claim 10, wherein the metallic conductive film is in the form of a line with a conductivity of at least 1,000 S/m.

14. The method of claim 10, wherein the substrate is a flexible textile substrate comprising a knit, woven, or nonwoven fabric comprising fibers of polyester, polyamides, spandex, nylon, Evolon®, elastane, cotton, cellulose, silk, wood, wool, or blends thereof.

15. The method of claim 14, wherein the adhesive gold ink conformally coats the fibers of the flexible textile substrate.

16. The method of claim 14, wherein depositing the adhesive gold ink is by inkjet printing on the flexible textile substrate that is heated to a temperature of about 30° C. to about 90° C.

17. The method of claim 10, further comprising, after curing the adhesive gold ink:
    coating at least a portion of the conductive pattern with a protective dielectric coating.

18. An adhesive gold ink comprising:
- 10 to 15 wt. % of a gold complex, the gold complex including a first ligand and a second ligand, wherein the first ligand is a thioether, a phosphine, or an amine that volatilizes upon heating at a temperature of 200° C. or less;
- 15 to 25 wt. % of the at least one alkyl alcohol;
- 10 to 15 wt. % of the at least one diol;
- 1 to 3 wt. % of the at least one amine;
- 1 to 5 wt. % of the at least one thiolalkyldiol; and
- less than 0.1 wt. % of a surfactant,
- wherein the wt. % is based on the total weight of the adhesive gold ink, and
- wherein the ink is clear and substantially free of particles.

19. The adhesive gold ink of claim 18, wherein the second ligand is a carboxylate represented by —O—C(O)—R, wherein R is an alkyl group having 10 carbon atoms or less, or 5 carbons or less.

20. A method for forming a conductive trace on a substrate, the method comprising:
- depositing the adhesive gold ink according to claim 18 on a substrate; and
- reducing the ink to produce a metallic conductive film, wherein the reducing is carried out by heating, irradiating, or by exposure to a reactive gas, and the metallic conductive film has a sheet resistance of less than 5 $\Omega/\square$.

* * * * *